Sept. 17, 1940.   J. E. MILLER ET AL   2,215,361
MACHINE FOR REINFORCING PIPE
Filed Sept. 11, 1939
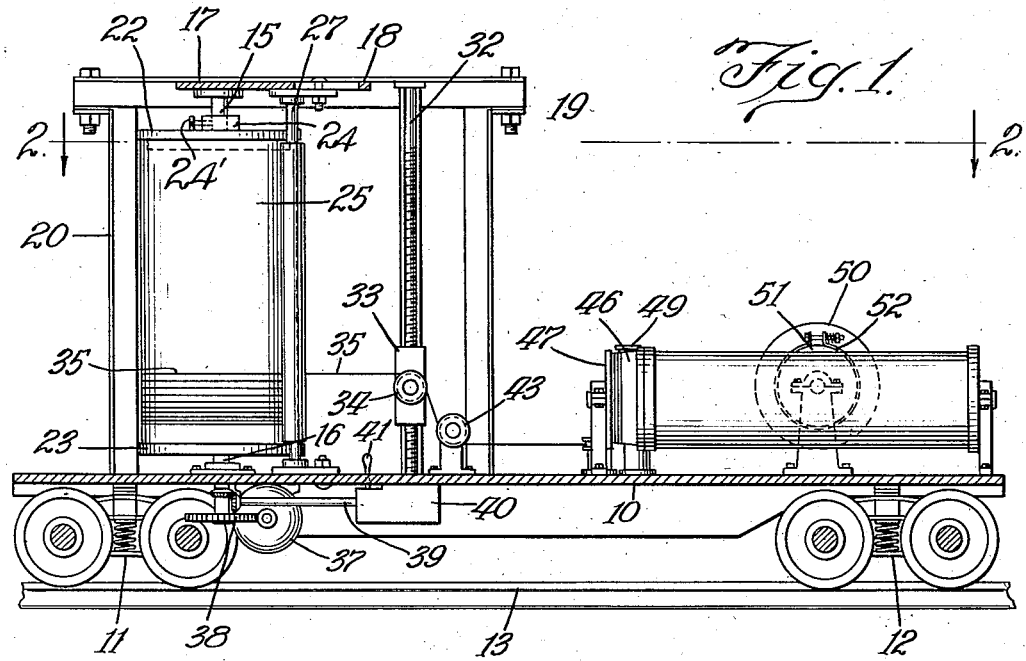
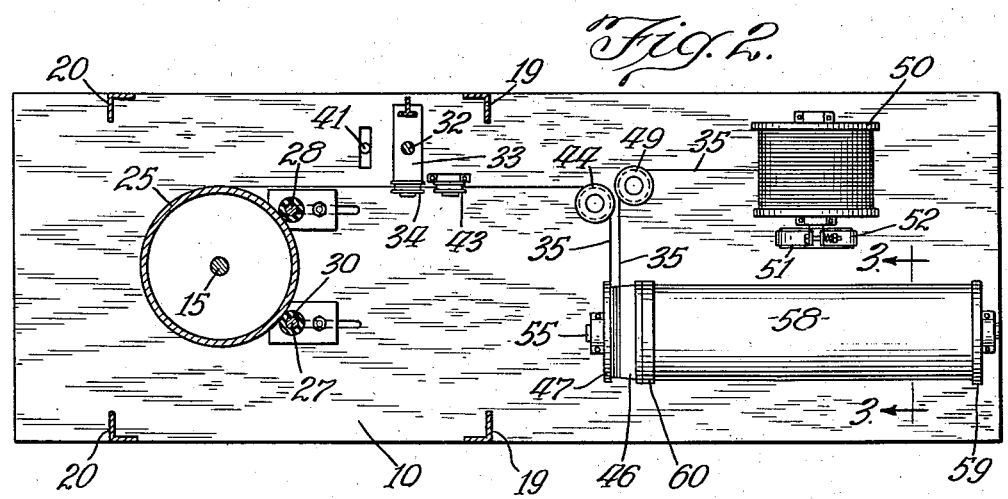
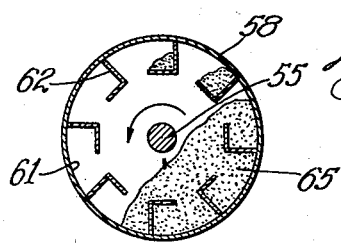
Inventors:
Joseph E. Miller and
Paul L. Osweiler
By Robert L. Kahn
Atty.

Patented Sept. 17, 1940

2,215,361

UNITED STATES PATENT OFFICE 2,215,361

MACHINE FOR REINFORCING PIPE

Joseph E. Miller, Oak Park, and Paul L. Osweiler, Bellwood, Ill.

Application September 11, 1939, Serial No. 294,308

4 Claims. (Cl. 242—11)

This invention relates to a machine for reinforcing pipes made of concrete or cast-iron and is an improvement upon the machine disclosed and claimed in our Patent 2,175,479, granted October 10, 1939. In the patent disclosed above, there is disclosed a machine having a plurality of rollers of rubber or similar material against which a section of concrete pipe in a horizontal position is forced by the tension of wire as it is wound on the pipe. The construction shown is convenient but takes up substantial horizontal space. Frequently pipes are made where used so that it is essential that the machine for reinforcing be mobile and require a minimum of room. With this in view the invention herein disclosed has been devised.

Referring to the drawing:

Figure 1 shows a side view of the complete machine;

Fig. 2 is a top view thereof; and

Fig. 3 is a section on line 3—3 of Fig. 2.

For convenience the machine is shown as mounted on a flat-car or base 10 having trucks 11 and 12 adapted to ride on railroad tracks 13. However, base 10 may be supported in any suitable manner desired. Base 10 carries a vertical shaft 15 journaled at 16 in the base and extending upwardly therefrom. The upper end of shaft 15 is journaled at 17 which journal is supported by a horizontal brace 18 bolted to vertical columns 19 and 20. It is understood that the various parts are made of steel or other suitable metal and is made strong enough for heavy duty.

Spaced on shaft 15 are a pair of end plates 22 and 23 keyed to the shaft and preferably of a generally circular outline. Plate 22 has a boss 24 into which a bolt 24' is threaded to hold plate 22 on shaft 15. By unbolting top brace 18 and removing plate 22 from shaft 15, a concrete pipe section 25 may be positioned around shaft 15 and against bottom plate 23. Then top plate 22 may be moved into position and brace 18 bolted. Top plate 22 may then be forced against the pipe end and bolted to shaft 15. Plates 22 and 23 are adapted to grip the end of concrete pipe 25 sufficiently tightly so that the pipe may be turned against a substantial force. It is understood that pipe 25 is centered with respect to shaft 15.

In spaced parallel relation to shaft 15 are a pair of shafts 27 and 28 extending between base 10 and brace 18 and journaled in adjustable bearings. Shafts 27 and 28 are covered by rubber or other flexible means to form rollers 30. As shown here, each shaft is covered by a continuous length of rubber. However, spaced sections of rubber may be used as disclosed in the application referred to above.

As clearly seen in Fig. 2, rubber rollers 30 rigidly carried by shafts 27 and 28 are adapted to press against the outside surface of concrete pipe section 25. It is understood, of course, that in order to accommodate various sizes of pipe, that the positions of shafts 27 and 28 may be varied so that the rubber rollers 30 may bear against the outside pipe surface.

In spaced relation to the concrete pipe supporting assembly is a long threaded screw 32 suitably journaled between base 10 and upper brace 18. Disposed around screw 32 as a movable nut is a carriage 33 which upon rotation of screw 32 may move up or down in accordance with the pitch of the thread. Carriage 33 carries an idler sheave 34 around which is guided reinforcing wire 35 which is to be wound around pipe 25.

Inasmuch as reinforcing wire 35 is wound around the outer surface of pipe 25 in the form of a helix, it is obvious that travel of carriage 33 along screw 32 is necessary while pipe 25 rotates and draws the wire upon itself. This is accomplished through a motor 37 driving pipe 25 through gears 38 attached to shaft 15. A stub-shaft 39 is suitably geared to drive shaft 15 and goes to a gear box 40 having a control handle 41. Gear box 40 is suitably connected through a plurality of selective gear ratios to screw 32 so that the rotation of screw 32 with respect to rotation of pipe 25 may be controlled and thus adjust the pitch of the reinforcing wire.

It is necessary during the winding of the wire on the pipe that the wire be kept under extreme tension. In order to do this, wire 35 is guided by an idler sheave 43 suitably supported on base 10. Following the wire to its source, the wire continues to an idler 44 rotating in a horizontal plane which leads wire 35 to a small tapered sheave 46. Sheave 46 has a flange 47 at the small end thereof from which wire 35 is fed. Wire 35 is preferably wound around sheave 46 several times, of the order of 3 or 4, and from there wire 35 then goes to an idler 49 which then guides wire 35 to a spool 50. Spool 50 is rotatably supported in any suitable manner on base 10 and is preferably provided with some retarding means such as a brake drum 51 and brake shoe 52 for preventing overrun of the spool.

Referring back to sheave 46, it will be noted that this is carried on a shaft 55 suitably journaled on base 10 and disposed horizontally. Preferably coaxial with sheave 46 and disposed on shaft 55 is a tensioning means 58 consisting of a cylindrical drum closed at both ends 59 and 60. Disposed on the inner surface 61 of drum 58 is a plurality of vanes 62 extending the full length of drum 58. Each vane 62 consists of an angle iron, although this is not essential. The drum is preferably caused to rotate in the direction shown by the arrow and in order to create a tension on wire 35 as it is drawn by pipe 25 there is disposed a loose medium such as sand 65 within the drum. It is evident that rotation of drum 58 will be resisted by the action of the vanes on the sand and it is also evident that upon stoppage of the machine, there will be no tendency for the tension in wire 35 to disappear. This is due to the unbalanced pile of sand which will be held by angle irons 62 when the machine stops. It is understood, of course, that any loose material of a similar nature may be used.

Inasmuch as the operation of the machine is obvious no detailed description thereof will be given. However, in order to space the initial and final turns of wire on the concrete pipe adjacent each other as well as to control the pitch of the helix of the wire on the pipe, gear shift 40 on screw 32 is provided and this gear shift may be and is controlled by a handle 41. It is understood, of course, that at the initial and final wire turns where the turns are adjacent, either a special gear ratio for screw 32 may be provided or else the carriage 33 may be stationary with the screw 32 idle and the wire 35 be permitted to feed naturally. For several turns such a procedure will be satisfactory and will have little or no tendency to guide the wire incorrectly.

It is also understood that the rubber supporting means may be disposed on the inside of the pipe in which case it will be on the other side of the shaft 15. It is preferred to support the concrete pipe in the manner shown by end plates 22 and 23 and reinforce the pipe section by means of the rubber rollers against the added tension due to the wire. However, it is understood, of course, that the rotation of the concrete pipe may be effected through the rubber rollers in the manner shown in the application previously referred to.

What is claimed is:

1. A machine for wrapping reinforcing wire around pipe comprising a base, means for rotatably supporting a pipe section vertically on said base, resilient means for supporting said pipe section at spaced intermediate regions of said pipe, said pipe section being adapted to have a wire reinforcement fastened thereto and pulled on by pipe rotation, a wire supply, tensioning means for said wire, means for rotating said pipe section to draw said wire around said pipe section and means for feeding said wire on said pipe section to provide a predetermined wire pitch on said pipe section.

2. The structure of claim 1 wherein said means for rotatably supporting said pipe section includes a pair of end members between which the pipe section is rigidly clamped and rotated.

3. The structure of claim 1 wherein said means for feeding said wire at a predetermined pitch includes a nut and screw disposed on an axis parallel to said pipe section.

4. The structure of claim 1 wherein said resilient means includes a plurality of rubber-covered rollers pressing said pipe section against the pull of said wire.

JOSEPH E. MILLER.
PAUL L. OSWEILER.